(12) United States Patent
Kanechika (10) Patent No.: US 12,320,490 B2
(45) Date of Patent: Jun. 3, 2025

(54) LAMP DEVICE (71) Applicant: Stanley Electric Co., Ltd., Tokyo (JP)

(72) Inventor: Masayuki Kanechika, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/708,748

(22) PCT Filed: Sep. 21, 2022

(86) PCT No.: PCT/JP2022/035153
§ 371 (c)(1),
(2) Date: May 9, 2024

(87) PCT Pub. No.: WO2023/089948
PCT Pub. Date: May 25, 2023

(65) Prior Publication Data
US 2025/0003570 A1 Jan. 2, 2025

(30) Foreign Application Priority Data

Nov. 22, 2021 (JP) .................. 2021-189687

(51) Int. Cl.
*B60Q 1/04* (2006.01)
*B60Q 1/00* (2006.01)
(Continued)

(52) U.S. Cl.
CPC ............ *F21S 45/00* (2018.01); *B60Q 1/0023* (2013.01); *B60Q 1/04* (2013.01); *F21S 41/148* (2018.01);
(Continued)

(58) Field of Classification Search
CPC ....... B60Q 1/04; B60Q 1/0023; F21S 41/148; F21S 41/336
(Continued)

(56) References Cited

U.S. PATENT DOCUMENTS 11,383,478 B2    7/2022  Nishio et al.
11,629,838 B2    4/2023  Kanechika et al.
(Continued)

FOREIGN PATENT DOCUMENTS

JP    2007-038973 A    2/2007
JP    2011163903 A     8/2011
(Continued)

OTHER PUBLICATIONS

International Search Report and Written Opinion for PCT/JP2022/035153 dated Dec. 13, 2022.
(Continued)

*Primary Examiner* — Christopher M Raabe
(74) *Attorney, Agent, or Firm* — KENEALY VAIDYA LLP (57) ABSTRACT A lamp device of the present invention includes a lamp unit comprised of a light source and a reflector having a mirror part which reflects light from the light source forward, and a radar unit arranged behind the lamp unit. The radar unit is arranged so that at least a portion of the mirror part falls within a radiation range of an electromagnetic wave radiated from the radar unit. The mirror part includes a resin member and a light reflecting surface formed on a surface of the resin member and comprised of an island-shaped metallic layer having metallic luster.

20 Claims, 4 Drawing Sheets (51) Int. Cl.
  *F21S 41/148* (2018.01)
  *F21S 41/33* (2018.01)
  *F21S 45/00* (2018.01)
  *G01S 13/931* (2020.01)

(52) U.S. Cl.
  CPC ........... *F21S 41/336* (2018.01); *G01S 13/931* (2013.01); *G01S 2013/93277* (2020.01)

(58) Field of Classification Search
  USPC ........................................................ 362/516
  See application file for complete search history.

(56) References Cited

U.S. PATENT DOCUMENTS

| | | | |
|---|---|---|---|
| 2008/0180965 | A1 | 7/2008 | Nakamura et al. |
| 2014/0313100 | A1* | 10/2014 | Yamamoto ............... C23C 18/48 428/323 |
| 2015/0218703 | A1* | 8/2015 | Okabe ...................... C25D 5/50 205/113 |
| 2019/0186707 | A1 | 6/2019 | Serizawa et al. |
| 2019/0275759 | A1* | 9/2019 | Nishio .................... B32B 9/041 |
| 2020/0358174 | A1 | 11/2020 | Shurish |
| 2020/0386381 | A1 | 12/2020 | Aizawa |
| 2022/0244177 | A1* | 8/2022 | Kurozuka .......... G01N 21/3554 |
| 2023/0018354 | A1 | 1/2023 | Kanechika et al. |
| 2023/0038282 | A1 | 2/2023 | Kanechika et al. |

FOREIGN PATENT DOCUMENTS

| | | |
|---|---|---|
| JP | 4842161 B2 | 12/2011 |
| JP | 5465030 B2 | 4/2014 |
| JP | 6400062 B2 | 10/2018 |
| JP | 2021-509467 A | 3/2021 |
| JP | 2021-099313 A | 7/2021 |
| WO | 2021/125044 A1 | 6/2021 |
| WO | 2021/125047 A1 | 6/2021 |

OTHER PUBLICATIONS

Supplementary European Search Report for corresponding European patent application No. 22895234.7 dated Sep. 2, 2024.

* cited by examiner

LAMP DEVICE

This application is a U.S. National Stage Application under 35 U.S.C § 371 of International Patent Application No. PCT/JP2022/035153 filed Sep. 21, 2022, which claims the benefit of priority under 35 U.S.C. § 119 to Japanese Patent Application No. 2021-189687 filed Nov. 22, 2021, the disclosures of all of which are hereby incorporated by reference in their entireties.

TECHNICAL FIELD

The present invention relates to a lamp device, particularly to a vehicular lamp device incorporating a radar device therein.

BACKGROUND ART

In addition to an acceleration sensor and a GPS sensor, various sensors such as a camera, LiDAR (Light Detection and Ranging), and a millimeter wave sensor are used for driving support and automatic driving.

In particular, a millimeter-wave radar apparatus maintains high environmental resistance performance without being affected by environments such as nighttime or backlight, and bad weather such as heavy fog, rainfall, and snowfall. Further, the millimeter-wave radar apparatus can directly detect the distance and direction to an object and the relative speed to the object. Therefore, it has the feature that even an object at a short distance can be detected at high speed and with high accuracy.

There has been proposed in Patent Literature 1, for example, a vehicular lamp in which a millimeter wave radar is mounted in a lamp chamber, and a light guide member which transmits millimeter waves is provided between a front cover and the millimeter wave radar.

Further, there has been disclosed in Patent Literature 2, a lamp device in which a light guide body which does not interfere with a radar function is provided in front of a radar device.

There has been disclosed in Patent Literature 3, a lamp device which covers at least part of the front surface of a radar unit and has a shielding member made of a foamed resin. There has been disclosed in Patent Literature 4, a vehicular system including a main body component formed of micro-bubble foam, and a radar device arranged behind the main body component and configured to transmit/receive radar waves through the inside thereof.

There has been disclosed in Patent Literature 5, a metal coating which is an aggregate of fine islands and which has metallic luster and is permeable to electromagnetic waves. Further, there has been disclosed in Patent Literature 6, an electromagnetic wave transmissive metallic luster member including an indium oxide-containing layer provided in a continuous state on the surface of a base, and a metal layer including a plurality of portions being at least partially discontinuous with each other, which is laminated on the indium oxide-containing layer.

CITATION LIST

Patent Literatures

Patent Literature 1: Japanese Patent No. 4842161
Patent Literature 2: International Publication WO 2021/125047A1
Patent Literature 3: International Publication WO 2021/125044A1
Patent Literature 4: Japanese Unexamined Patent Application Publication No. 2021-509467
Patent Literature 5: Japanese Patent No. 5465030
Patent Literature 6: Japanese Patent No. 6400062

SUMMARY OF INVENTION

Technical Problem

However, when the light guide body is provided in front of the radar device, the brightness of the light guide body decreases when the light guide body is made thin because of transmission of an electromagnetic wave, and the transmittance of the electromagnetic wave decreases when the light guide body is made thick, and others occur. This result in both optical and electromagnetic restrictions.

In particular, conventionally, it is assumed that the light guide body and the shielding member are provided in front of the radar device and arranged near a daytime running lamp and a signal lamp. It was not envisaged to arrange the radar device at the position where they interfere with a headlight being a main running lamp.

The present invention has been made in view of the above-described viewpoints, and an object of the present invention is to provide a lamp device which is capable of suppressing attenuation and reflection of a radar wave even when a radar device is arranged at a position where a reflector of a lamp and a radiated electromagnetic wave (radar wave) overlap, and in which a radar functional loss is sufficiently reduced without changing an electromagnetic wave radiation pattern.

Solution to Problem

A lamp device according to a first embodiment of the present invention includes:
  a lamp unit comprised of a light source and a reflector having a mirror part which reflects light from the light source forward, and
  a radar unit arranged behind the lamp unit,
  in which the radar unit is arranged so that at least a portion of the mirror part falls within a radiation range of an electromagnetic wave radiated from the radar unit, and
  in which the mirror part includes a resin member and a light reflecting surface formed on a surface of the resin member and comprised of an island-shaped metallic layer having metallic luster.

DESCRIPTION OF EMBODIMENTS

Figure 1:
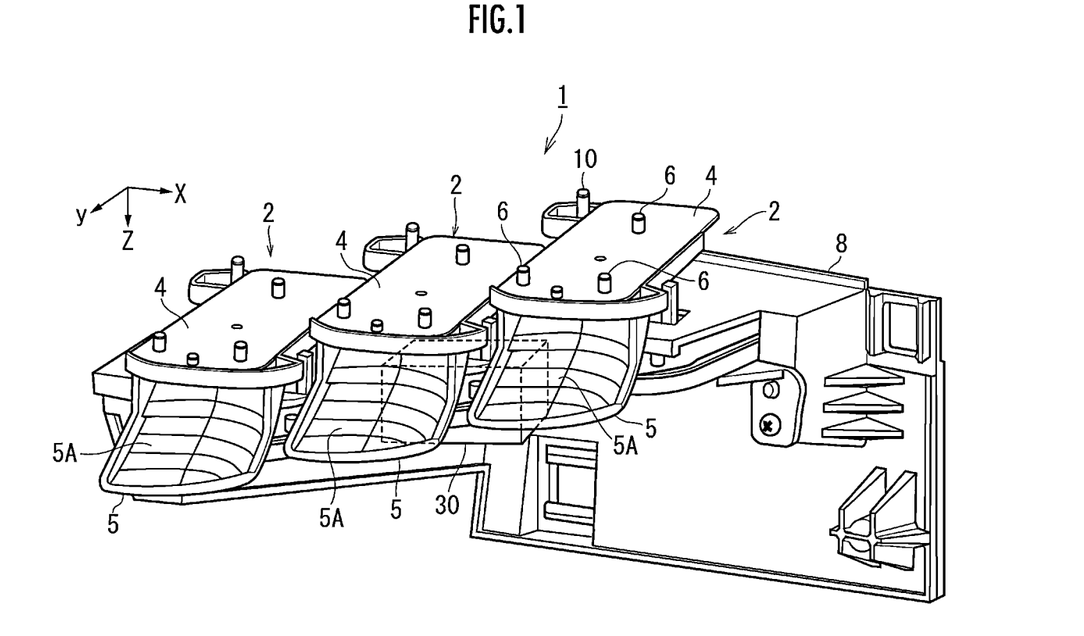
FIG. 1 is a perspective view illustrating an essential part of a lamp device 1 according to a first embodiment of the present invention.
Figure 2:
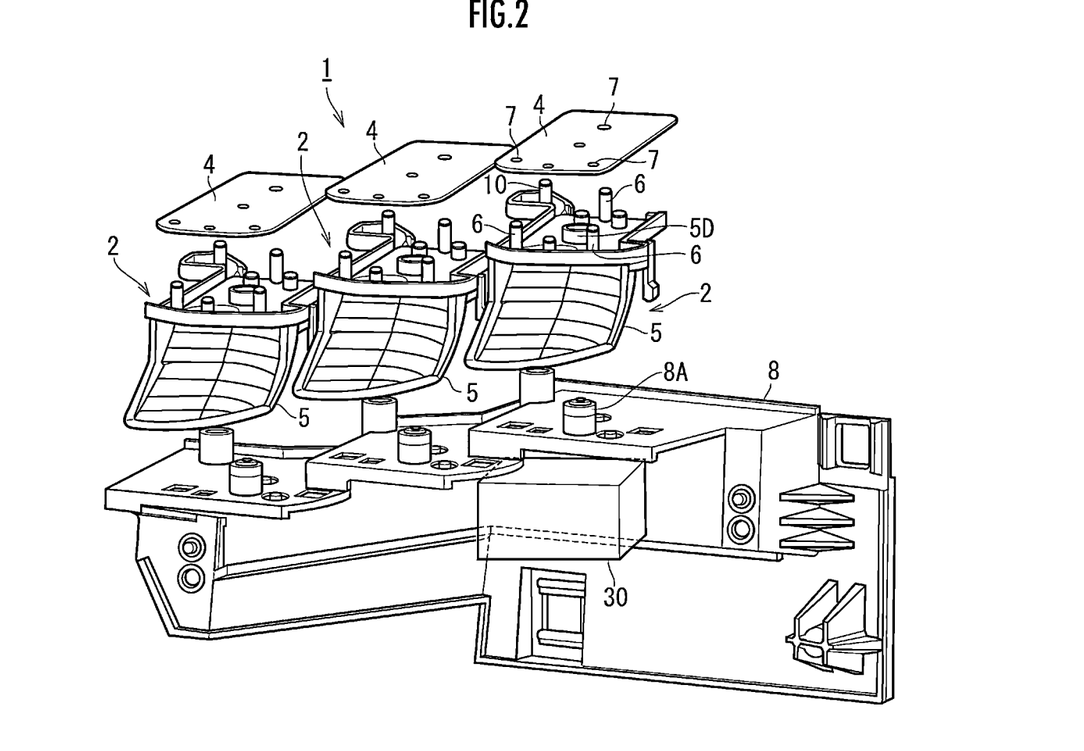
FIG. 2 is an exploded perspective view of the essential part of the lamp device 1.
Figure 3:
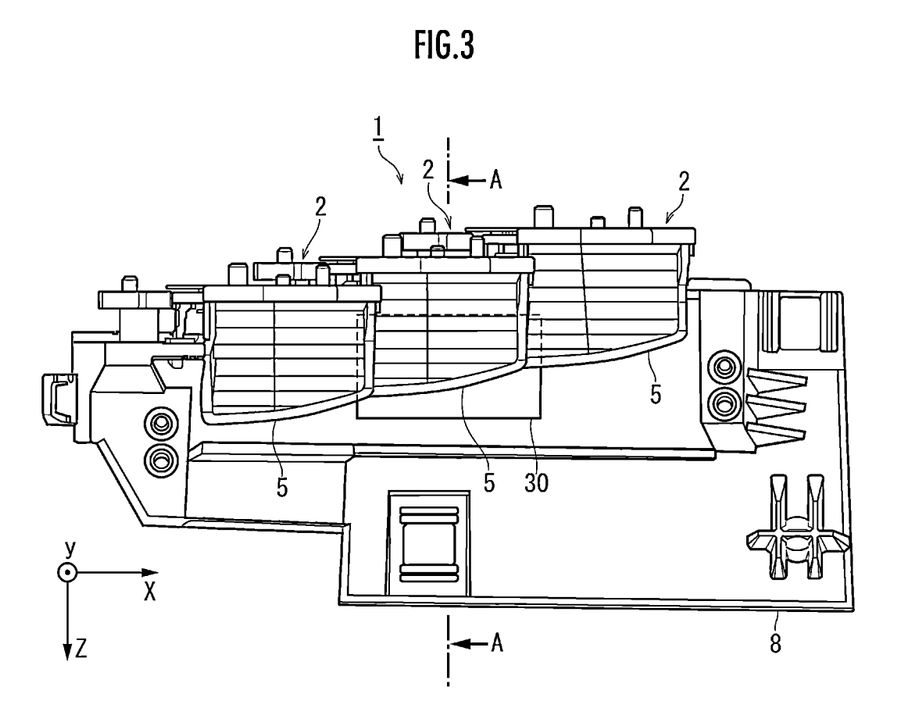
FIG. 3 is a front view of the essential part of the lamp device 1.
Figure 4:
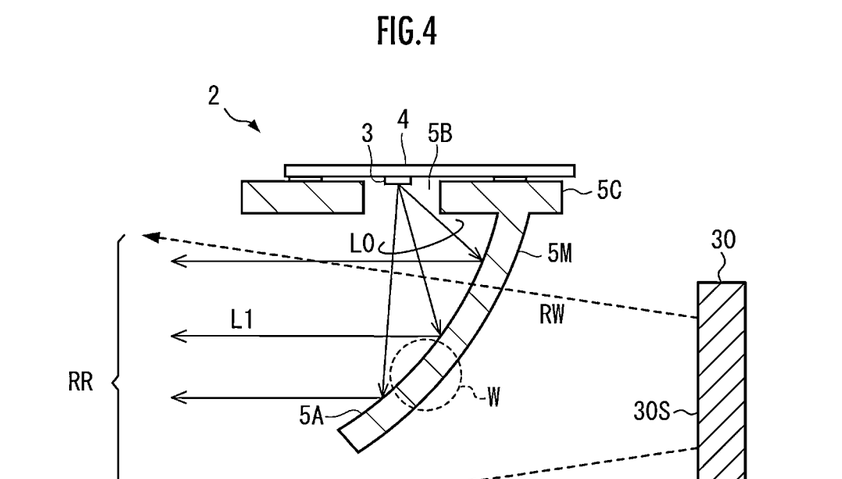
FIG. 4 is a cross-sectional view illustrating a cross section taken along line A-A illustrated in FIG. 3.

FIG. 1 is a perspective view illustrating the essential part of the lamp device 1 according to the first embodiment of the present invention, FIG. 2 is an exploded perspective view of the essential part of the lamp device 1, and FIG. 3 is a front view of the essential part of the lamp device 1. Further, FIG. 4 is a cross-sectional view illustrating a cross section taken along line A-A illustrated in FIG. 3.

Note that the drawings illustrate a three-axis coordinate system in which the traveling direction of a vehicle to which the lamp device 1 is attached is defined as a y direction, the left direction is defined as an x direction, and the downward direction (direction of gravity) is defined as a z direction.

The lamp device 1 according to the present embodiment is a vehicular lamp, and is used as headlamps arranged on the left and right sides of the front part of the vehicle. Since the left and right headlamps are the same in basic configuration, only one lamp device 1 (left headlamp) arranged on the front left side of the vehicle will be illustrated and described below.

Also, a description will be made as an example about the case in which the lamp device 1 is a headlamp for main driving, but the lamp device 1 may be a lamp device having the purpose and function of emitting light to the outside such as a tail lamp or a backlight.

Note that in the present specification, an automobile is described as an example of a vehicle, but the present invention is not limited to this. That is, in the present specification, the term Vehicle means vehicles such as a ship, an aircraft, etc., and manned and unmanned means of transportation or movement.

As illustrated in FIGS. 1 to 3, the lamp device 1 according to the present embodiment includes three reflection-type lamp units 2 arranged side by side in a lateral direction. Also, as illustrated in FIG. 4, each lamp unit 2 includes a light source comprised of a light emitting element 3 which is an LED, and a rectangular flat-shaped circuit board 4 with the light emitting element 3 mounted on its lower surface, and a reflector 5 which reflects light emitted downward from the light emitting element 3 toward the front of the vehicle.

Note that although not illustrated, the three lamp units 2 are accommodated in a lamp chamber defined by a housing and an outer lens being a transparent cover covering a front opening portion of the housing.

Further, the lamp device 1 has a radar unit 30 which is a radar device, as an obstacle detection device. As illustrated in FIGS. 1 to 3, the radar unit 30 is arranged behind the reflectors 5 of the lamp units 2 (−y direction).

The radar unit 30 is controlled by, for example, an unillustrated ECU (Electronic Control Unit). The radar unit 30 radiates electromagnetic waves (millimeter waves) from a transmitting antenna, and receives reflected waves reflected by an object with a receiving antenna.

The received signal is subjected to signal processing by the corresponding control device, so that the distance, angle, and speed to the object are detected, whereby obstacle detection is performed. The radar unit 30 is used, for example, as an obstacle detection device for an advanced emergency braking system (AEBS) and an adaptive cruise control (ACC). Alternatively, the radar unit 30 can also be used as a rear side obstacle detection device and a pedestrian detection device.

In the radar unit 30, for example, millimeter waves in a 76-81 GHz band, particularly millimeter waves in a 76-77 GHz band or a 79 GHz band are preferably used as radiated electromagnetic waves in terms of resolution and accuracy. However, the radar unit 30 is not limited to the above frequency bands, and other frequency bands, for example, quasi-millimeter waves such as a 24 GHz band may be used.

In each lamp unit 2, the circuit board 4 is positioned and fixed onto the upper surface of the reflector 5. That is, as illustrated in FIGS. 1 and 2, positioning pins 6 are integrally erected at three points on the upper surface of the reflector 5. Circular positioning holes 7 (refer to FIG. 2) are formed at three points (three points corresponding to the positioning pins 6 of the reflector 5) on the circuit board 4.

Therefore, when the three positioning pins 6 erected on the upper surface of the reflector 5 are fitted into the three positioning holes 7 formed in the circuit board 4 to place the circuit board 4 on the upper surface of the reflector 5, the circuit board 4 is accurately positioned on the upper surface of the reflector 5.

Then, when the circuit board 4 is adhered to the upper surface of the reflector 5 with an adhesive or the like high in thermal conductivity from this state, the circuit board 4 is fixed in the state of being positioned on the upper surface of the reflector 5. Note that the lower surface of the circuit board 4 serves as a low reflectivity surface, and a black resist film is formed on the lower surface of the circuit board 4 in the present embodiment.

Then, as illustrated in FIG. 4, the light emitting element 3 is mounted on the bottom surface of the circuit board 4 so that its light emitting direction is downward (z direction). Note that the circuit board 4 and the reflector 5 may be fixed by screws or heat caulking instead of bonding with an adhesive. Further, in the present embodiment, a black resist film having a reflectance of 10% or less is formed on the bottom surface of the circuit board 4.

Here, a black coating film having a reflectance of 10% or less may be formed on the bottom surface of the circuit board 4 in addition to the resin film. It may be formed on the bottom surface of the circuit board 4 so that the reflectance becomes 10% or less by appropriately adjusting the thickness of the coating film and the concentration of a reflective material (for example, carbon powder). Further, since the carbon powder also has light absorptivity, a black resist film having a high absorption surface with a light absorption rate of 90% or more may be formed on the bottom surface of the circuit board 4. That is, the coating film which suppresses glare light may have not only low reflectance but also high absorption rate.

By the way, each reflector 5 is integrally molded with a resin and has a reflecting surface 5A curved into a rotating paraboloid shape. Then, as illustrated in FIG. 4, an opening portion 5B for allowing light L0 emitted downward from the light emitting element (LED) 3 to pass therethrough is formed in a part of an upper wall of each reflector 5.

Further, each reflector 5 is rotatably supported on the upper surface of a bracket 8 integrally molded in the shape of a rectangular frame with a resin. That is, as illustrated in FIG. 2, a cylindrical bearing portion 5D is integrally protruded at the central portion of the upper wall of the reflector 5, and the bearing portion 5D is fitted from above onto the outer periphery of a cylindrical boss 8A integrally erected on the upper surface of the bracket 8, whereby each reflector 5 is supported on the upper surface of the bracket 8 to be horizontally rotatable about the boss 8A.

Next, the reflector 5 and the radar unit 30 will be described in detail with reference to FIGS. 4 and 5. FIG. 4 illustrates a cross section of the lamp device 1 on a plane (yz plane) orthogonal to the left/right direction thereof (±x direction).

As illustrated in FIG. 4, the reflector 5 includes a base 5C and a mirror part 5M erected downward (z direction) from the base 5C. The base 5C has a substantially flat plate shape and is formed so as to be substantially parallel to a horizontal plane (xy plane) when the lamp device 1 is mounted in the vehicle. The mirror part 5M has a curved surface-like reflecting surface 5A.

In the lamp device 1, the circuit board 4 is placed on the base 5C. Then, when current is supplied to each lamp unit 2 from an unillustrated power source such as a battery, the light emitting element 3 emits light, and the light L0 passes through the opening portion 5B of the reflector 5 and emits toward the reflecting surface 5A of the reflector 5. Then, light L1 reflected from the reflecting surface 5A of the reflector 5 is transmitted through an unillustrated transparent outer lens and irradiated forward of the vehicle, so that the lamp device 1 functions as a headlamp.

The radar unit 30 having an electromagnetic wave radiation surface 30S is arranged behind the reflector 5 of the lamp unit 2 (−y direction). More specifically, an electromagnetic wave RW radiated from the electromagnetic wave radiation surface 30S of the radar unit 30 is incident on the mirror part 5M of the reflector 5 from a rear surface of the reflector 5, and at least part thereof is transmitted through the mirror part 5M and radiated forward.

Note that the lamp unit 2 and the radar unit 30 are arranged in a positional relationship such that the light source comprised of the light emitting element 3 and the circuit board 4, and the base 5C of the reflector 5, etc., do not fall within a radiation range RR of the electromagnetic wave RW radiated from the radar unit 30. That is, the lamp unit 2 and the radar unit 30 are arranged in a positional relationship such that only the mirror part 5M of the reflector 5 falls within the radiation range RR of the radiated electromagnetic wave RW.

Note that the radar radiation range RR is equivalent to a radar detection range represented as a radar FOV (Field Of View). The radar radiation range RR is specifically determined as a range which requires detection. For example, a radar for detecting the surroundings of the vehicle has a detection range of about ±20° in the vertical direction and about ±80° in the horizontal direction with respect to the normal line direction of the electromagnetic wave radiation surface 30S of the radar unit 30.

Figure 5:
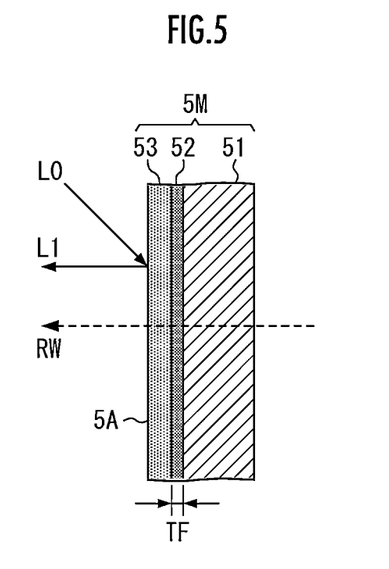
FIG. 5 is a partially enlarged cross-sectional view illustrating a cross section of a portion W of a mirror part 5M of a reflector 5 in enlarged form.

FIG. 5 is a partially enlarged cross-sectional view illustrating a cross section of a portion W of the mirror part 5M of the reflector 5 in enlarged form. The mirror part 5M is comprised of a foamed resin member 51, a flat resin layer 52 formed on the foamed resin member 51, and an island-shaped metallic layer 53 formed on the flat resin layer 52.

The foamed resin of the foamed resin member 51 is formed by encapsulating carbon dioxide gas or the like in a resin such as polycarbonate, acrylic, polyimide, epoxy, or the like, and creating air bubbles in the resin. Since gas is encapsulated in the resin, the dielectric constant is lowered, and the influence on electromagnetic waves can be greatly reduced. Therefore, the electromagnetic wave transmission characteristics of the foamed resin member 51 are excellent. Note that when the foaming ratio of the foamed resin is double or more, the influence of the resin can be almost ignored.

The surface of the foamed resin member 51 is flattened by the flat resin layer 52. Since the surface of the foamed resin has unevenness, light is scattered, thus making light distribution difficult. The flat resin layer 52 having the flat surface can be formed by spraying of a highly viscous epoxy resin or the like onto the surface of the foamed resin member 51 in manner of a coating process, and the like.

As another method, the flat resin layer 52 may be configured to form a flat surface not only in the coating process, but also by raising the temperature of the mold to a high temperature when the foamed resin member 51 is formed using a mold, thereby melting the surface of the foamed resin at the contact surface of the mold and the foamed resin member.

Further, it is possible to flatten the surface of the foamed resin member 51 by using, for example, a welded laminate film made of PET+PP (PET: polyethylene terephthalate, PP: polypropylene) in which resins different in melting point are laminated, and by welding a resin low in melting point to the foamed resin.

Note that since the epoxy resin is high in viscosity, it does not penetrate deep into the foamed resin. Further, for example, the welded laminate film made of PET+PP can be prevented from penetrating deep into the foamed resin by controlling the thickness of a welded resin layer low in melting point.

By setting the thickness (TF) of the flat resin layer 52, that is, the epoxy resin or the laminate of resins different in melting point to ⅟20 or less of the effective wavelength $\lambda d$ of the radiated electromagnetic wave RW in the resin (TF≤$\lambda d$/20), it is possible to prepare such a surface as to enable the island-shaped metallic layer 53 to be formed on the surface of the flat resin layer 52 without deteriorating the electromagnetic wave transmission characteristics of the foamed resin.

The island-shaped metallic layer 53 is formed on the flat resin layer 52. The island-shaped metallic layer 53 is an aggregate of fine islands, and is a metal coating which has metallic luster and is permeable to electromagnetic waves.

Here, the island-shaped metallic layer 53 has an island-shaped structure in which a metal layer is partitioned by fine cracks. The island-shaped metallic layer 53 can reflect the light L0 from the light emitting element 3 with sufficient reflectance. Therefore, the mirror part 5M fully exerts the function as a reflector.

For example, indium, palladium, nickel, nickel alloy, copper, copper alloy, silver, silver alloy, tin, tin alloy, etc. can be used as the metal for the island-shaped metallic layer 53, but the metal is not limited to these. The island-shaped metallic layer 53 can be formed by electroless plating of these metals or the like.

As illustrated in FIG. 5, the light L0 from the light emitting element 3 is reflected with sufficient reflectance by the mirror part 5M having such a configuration, so that the reflected light L1 can be obtained, and the attenuation of the radiated electromagnetic wave RW from the radar unit 30 is suppressed.

Therefore, even when the radar unit 30 is arranged behind the reflector 5 and the radiated electromagnetic wave RW is incident on the mirror part 5M of the reflector 5 from the rear surface of the reflector 5, an obstacle detection function of the radar unit 30 is fully exerted.

That is, even if the radar unit 30 is arranged at a position where the mirror part 5M of the reflector 5 and the radiated electromagnetic wave (radar wave) overlap, it is possible to provide a lamp device which is capable of suppressing attenuation and reflection of the radiated electromagnetic wave and in which the functional loss of the radar is sufficiently reduced without changing an electromagnetic radiation pattern.

Further, the degree of freedom in arranging the radar unit 30 is increased, thereby enabling application thereof to obstacle detection for various purposes. Moreover, since the radar unit 30 is arranged behind the reflector 5, it is difficult to be visually recognized from the outside. Since the radar unit 30 can be hidden, it is convenient in terms of design.

Figure 6:
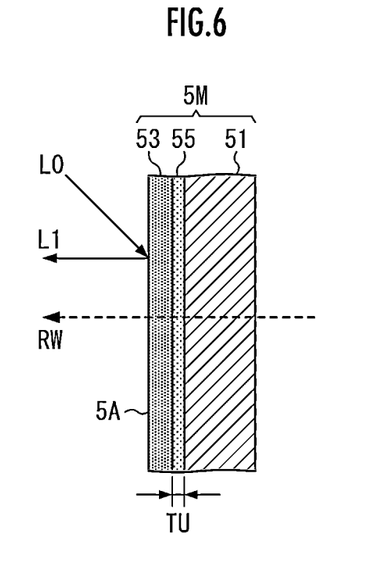
FIG. 6 is a partially enlarged cross-sectional view illustrating a cross section of a portion W of another example of the mirror part 5M in enlarged form.

FIG. 6 is a partially enlarged cross-sectional view illustrating in enlarged form, a cross section of a portion W of another example of the mirror part 5M. The mirror part 5M is comprised of a foamed resin member 51, a base layer 55 formed on the foamed resin member 51, and an island-shaped metallic layer 53 formed on the base layer 55.

The base layer 55 is made of an indium tin oxide (ITO). The base layer 55 can be formed on the foamed resin member 51 by sputtering or vapor deposition, or the like. The base layer 55 is not limited to the indium tin oxide (ITO), and metal oxides such as an indium oxide and an indium zinc oxide (IZO), and the like can be used.

Note that by setting the thickness (TU) of the base layer 55 to $1/20$ or less of the effective wavelength $\lambda u$ of the radiated electromagnetic wave RW in the base layer 55 (TU≤$\lambda u$/20), it is possible to prepare such a surface as to enable the island-shaped metallic layer 53 to be formed on the surface of the base layer 55 without deteriorating the electromagnetic wave transmission characteristics of the foamed resin.

Figure 7:
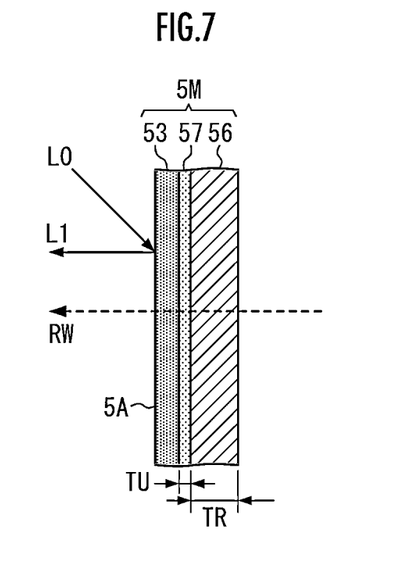
FIG. 7 is a partially enlarged cross-sectional view illustrating a cross section of a portion W of a further example of the mirror part 5M in enlarged form.

FIG. 7 is a partially enlarged cross-sectional view illustrating in enlarged form, a cross section of a portion W of a further example of the mirror part 5M. The mirror part 5M is comprised of a flat-like resin substrate 56, a base layer 57 formed on the resin substrate 56, and an island-shaped metal layer 53 formed on the base layer 57. The base layer 57 is similar to the base layer 55 described above. A metal oxide or the like can be used for the base layer 57.

The resin substrate 56 is made of a non-foaming resin and has a thickness TR. When the thickness TR satisfies the following relationship when assuming that the effective wavelength of the radiated electromagnetic wave RW in the resin substrate 56 is $\lambda r$, it is possible to reduce reflection losses occurring at the interface between the resin substrate 56 and the space and the interface between the resin substrate 56 and the base layer 57.

$$TR = m \times \lambda r/2$$

(where m is a natural number)

Incidentally, even if the thickness TR of the resin substrate 56 does not necessarily completely match the above relational expression, the reflection loss of power can be suppressed extremely effectively by setting the reflection loss to fall within the frequency band in which the reflection loss is −10 dB or less (reflected power is 10% or less) with respect to the frequency f of the radiated electromagnetic wave RW.

Even in the case described with reference to FIGS. 6 and 7, even if the radar unit 30 is arranged behind the reflector 5 and the radiated electromagnetic wave RW enters the mirror part 5M of the reflector 5 from the back surface of the reflector 5, the obstacle detection function of the radar unit 30 is sufficiently exerted.

Figure 8A:
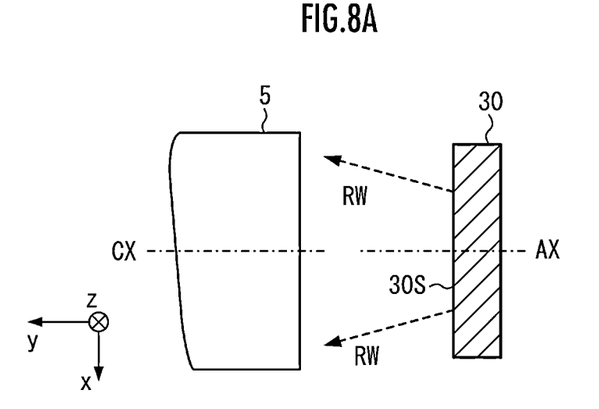
FIG. 8A is a top view schematically illustrating a relative arrangement relationship between the reflector 5 and a radar unit 30 when the lamp device 1 is viewed from its upper surface.
Figure 8B:
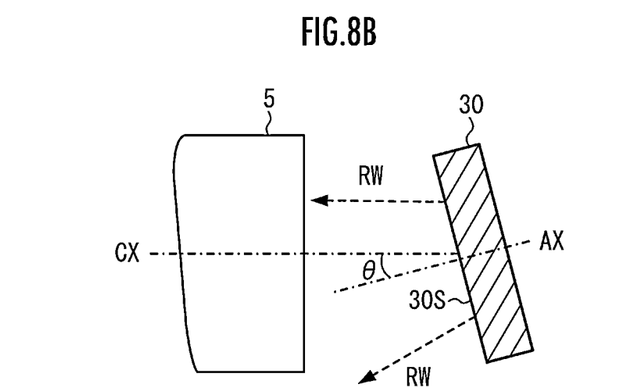
FIG. 8B is a view illustrating another example of the arrangement relationship between the reflector 5 and the radar unit 30.

Next, the arrangement angles of the reflector 5 and the radar unit 30 will be described with reference to FIGS. 8A and 8B. FIG. 8A is a view schematically illustrating a relative arrangement relationship between the reflector 5 and the radar unit 30 when the lamp device 1 is viewed from the upper surface (xy plane) (also referred to as a top view). FIG. 8B is a view illustrating another example of the arrangement relationship between the reflector 5 and the radar unit 30.

In the case illustrated in FIG. 8A, the radar unit 30 and the reflector 5 are arranged such that the central axis (i.e., the central axis of radiation of the radiated electromagnetic wave RW) AX of the electromagnetic radiation surface 30S of the radar unit 30 is in the same direction (+y direction) as the irradiation direction (that is, the forward direction of the vehicle) of the reflector 5.

Note that as described above, each reflector 5 is rotatably supported in the horizontal plane. Therefore, regardless of the irradiation direction of the reflector 5, an irradiation central axis CX of the reflector 5 and the radiation central axis AX of the radiated electromagnetic wave RW may be arranged to be in the same direction.

In the case of another arrangement example illustrated in FIG. 8B, the radar unit 30 and the reflector 5 are arranged so that the radiation central axis AX of the radiated electromagnetic wave RW has an angle θ relative to the irradiation central axis CX of the reflector 5.

Even if the radar unit 30 and the reflector 5 are arranged with the relative angle θ as in the case illustrated in FIG. 8B, the obstacle detection function of the radar unit 30 is sufficiently exerted as described with reference to FIGS. 4 to 7.

As described in detail above, even if the radar device is arranged at a position where the reflector of the main running lamp and the radiated electromagnetic wave (radar wave) overlap, it is possible to provide a lamp device which is capable of suppressing the attenuation and reflection of the radar wave and in which the functional loss of the radar is sufficiently reduced without changing the electromagnetic wave radiation pattern.

DESCRIPTION OF REFERENCE NUMERALS

1: lamp device
2: lamp unit
3: light emitting element
4: circuit board
5: reflector
5C: reflector base
5M: mirror part
30: radar unit
30S: electromagnetic wave radiation surface
51: foamed resin member
52: flat resin layer
53: island-shaped metallic layer
55, 57: base layer
56: resin substrate
RR: electromagnetic wave radiation range
RW: radiated electromagnetic wave

The invention claimed is:

1. A lamp device for a vehicle, comprising:
   a lamp unit comprised of a light source and a reflector having a mirror part which reflects light from the light source forward, and a radar unit arranged behind the lamp unit,
wherein the radar unit is arranged so that at least a portion of the mirror part falls within a radiation range of an electromagnetic wave radiated from the radar unit,
wherein the mirror part includes a resin member and a light reflecting surface formed on a surface of the resin member and comprised of a metallic layer which is partitioned by fine cracks and reflects the light from the light source,
wherein the resin member is comprised of a resin substrate and an intermediate layer formed on the resin substrate, and the metallic layer is formed on the intermediate layer,
wherein the light source emits the light from a position which does not fall within the radiation range of the electromagnetic wave radiated from the radar unit, toward the light reflecting surface which is located within the radiation range of the electromagnetic wave radiated from the radar unit, and
wherein when a thickness of the resin substrate is TR, the thickness of the resin satisfies following conditions (1) and/or (2):
(1) when an effective wavelength of the radiated electromagnetic wave in the intermediate layer is $\lambda r$, $$TR = m \times \lambda r/2$$

(where m is a natural number) is satisfied; and
(2) when an effective wavelength of the radiated electromagnetic wave in the intermediate layer is $\lambda r$, $TR < \lambda r/2$ is satisfied when a reflection loss of the resin substrate with respect to the radiated electromagnetic wave is less than a transmission loss, and when the reflection loss is greater than or equal to the transmission loss, TR is set so that the reflection loss is $-10$ dB or less.

2. A lamp device, comprising:
a lamp unit comprised of a light source and a reflector having a mirror part which reflects light from the light source forward, and
a radar unit arranged behind the lamp unit,
wherein the radar unit is arranged so that at least a portion of the mirror part falls within a radiation range of an electromagnetic wave radiated from the radar unit,
wherein the mirror part includes a resin member and a light reflecting surface formed on a surface of the resin member and comprised of an island-shaped metallic layer having metallic luster,
wherein the resin member is comprised of a resin substrate and a base layer formed on the resin substrate and comprised of a metal oxide, and the island-shaped metallic layer is formed on the base layer, and
wherein when a thickness of the resin substrate is TR and an effective wavelength of the radiated electromagnetic wave in the base layer is $\lambda r$, TR and $\lambda r$ satisfy the following expression:

$$TR = m \times \lambda r/2$$

(where m is a natural number).

3. The lamp device according to claim 2, wherein the resin substrate is made of a non-foaming resin.

4. The lamp device according to claim 2, wherein when the thickness of the base layer is TU, and the effective wavelength of the radiated electromagnetic wave in the base layer is $\lambda u$, $TU \leq \lambda u/20$ is satisfied.

5. The lamp device according to claim 2, wherein the island-shaped metallic layer has an island-shaped structure in which a metal layer is partitioned by fine cracks, and metal portions which reflect the light from the light source are arranged.

6. The lamp device according to claim 5, wherein the metal portions include at least one selected from the group consisting of indium, palladium, nickel, nickel alloy, copper, copper alloy, silver, silver alloy, tin, and tin alloy.

7. The lamp device according to claim 2, wherein the radar unit radiates a millimeter wave in a 76 to 81 Ghz band as the electromagnetic wave, and includes a receiving antenna for receiving a reflected wave which is reflected by an object.

8. The lamp device according to claim 6, wherein the radar unit radiates a millimeter wave in a 76 to 81 Ghz band as the electromagnetic wave, and includes a receiving antenna for receiving a reflected wave which is reflected by an object.

9. The lamp device according to claim 2, wherein the light source emits the light from a position which does not fall within the radiation range of the electromagnetic wave radiated from the radar unit, toward the light reflecting surface which is located within the radiation range of the electromagnetic wave radiated from the radar unit.

10. The lamp device according to claim 4, wherein the light source emits the light from a position which does not fall within the radiation range of the electromagnetic wave radiated from the radar unit, toward the light reflecting surface which is located within the radiation range of the electromagnetic wave radiated from the radar unit.

11. The lamp device according to claim 10, wherein the radar unit radiates a millimeter wave in a 76 to 81 Ghz band as the electromagnetic wave, and includes a receiving antenna for receiving a reflected wave which is reflected by an object.

12. A lamp device, comprising:
a lamp unit comprised of a light source and a reflector having a mirror part which reflects light from the light source forward; and
a radar unit arranged behind the lamp unit,
wherein the radar unit is arranged so that at least a portion of the mirror part falls within a radiation range of an electromagnetic wave radiated from the radar unit,
wherein the mirror part includes a resin member and a light reflecting surface formed on a surface of the resin member and comprised of an island-shaped metallic layer having metallic luster,
wherein the resin member is comprised of a resin substrate and a base layer formed on the resin substrate and comprised of a metal oxide, and the island-shaped metallic layer is formed on the base layer, and
wherein when it is assumed that a thickness of the resin substrate is TR, and an effective wavelength of the radiated electromagnetic wave in the base layer is $\lambda r$, $TR < \lambda r/2$ is satisfied when a reflection loss of the resin substrate with respect to the radiated electromagnetic wave is less than a transmission loss, and when the reflection loss is greater than or equal to the transmission loss, TR is set so that the reflection loss is $-10$ dB or less.

13. The lamp device according to claim 12, wherein when the thickness of the base layer is TU, and the effective wavelength of the radiated electromagnetic wave in the base layer is $\lambda u$, $TU \leq \lambda u/20$ is satisfied.

14. The lamp device according to claim 12, wherein the resin substrate is made of a non-foaming resin.

15. The lamp device according to claim 13, wherein the resin substrate is made of a non-foaming resin.

16. The lamp device according to claim 12, wherein the island-shaped metallic layer has an island-shaped structure in which a metal layer is partitioned by fine cracks, and metal portions which reflect the light from the light source are arranged.

17. The lamp device according to claim 16, wherein the metal portions include at least one selected from the group consisting of indium, palladium, nickel, nickel alloy, copper, copper alloy, silver, silver alloy, tin, and tin alloy.

18. The lamp device according to claim 16, wherein the radar unit radiates a millimeter wave in a 76 to 81 Ghz band as the electromagnetic wave, and includes a receiving antenna for receiving a reflected wave which is reflected by an object.

19. The lamp device according to claim 12, wherein the light source emits the light from a position which does not fall within the radiation range of the electromagnetic wave radiated from the radar unit, toward the light reflecting surface which is located within the radiation range of the electromagnetic wave radiated from the radar unit.

20. The lamp device according to claim 13, wherein the light source emits the light from a position which does not fall within the radiation range of the electromagnetic wave radiated from the radar unit, toward the light reflecting surface which is located within the radiation range of the electromagnetic wave radiated from the radar unit.

* * * * *